US008621120B2

(12) United States Patent
Bender et al.

(10) Patent No.: US 8,621,120 B2
(45) Date of Patent: Dec. 31, 2013

(54) STALLING OF DMA OPERATIONS IN ORDER TO DO MEMORY MIGRATION USING A MIGRATION IN PROGRESS BIT IN THE TRANSLATION CONTROL ENTRY MECHANISM

(75) Inventors: Carl Alfred Bender, Highland, NY (US); Patrick Allen Buckland, Austin, TX (US); Steven Mark Thurber, Austin, TX (US); Adalberto Guillermo Yanes, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1627 days.

(21) Appl. No.: 11/279,906

(22) Filed: Apr. 17, 2006

(65) Prior Publication Data

US 2007/0260768 A1 Nov. 8, 2007

(51) Int. Cl.
  *G06F 13/14* (2006.01)
(52) U.S. Cl.
  USPC ............................................. 710/22; 710/33
(58) Field of Classification Search
  None
  See application file for complete search history.

(56) References Cited

U.S. PATENT DOCUMENTS

| | | | |
|---|---|---|---|
| 5,377,337 A * | 12/1994 | Antognini et al. | 718/100 |
| 6,654,818 B1 | 11/2003 | Thurber | |
| 6,785,759 B1 | 8/2004 | Beukema et al. | |
| 6,804,729 B2 * | 10/2004 | Swanberg | 710/22 |
| 6,931,471 B2 | 8/2005 | Arndt et al. | |
| 7,117,385 B2 | 10/2006 | Chokshi et al. | |
| 2003/0191881 A1 | 10/2003 | Arndt et al. | |
| 2003/0212873 A1 * | 11/2003 | Lee et al. | 711/170 |
| 2004/0019751 A1 | 1/2004 | Sharma et al. | |
| 2004/0064601 A1 | 4/2004 | Swanberg | |
| 2004/0210793 A1 | 10/2004 | Chokshi et al. | |
| 2005/0114623 A1 | 5/2005 | Craddock et al. | |

FOREIGN PATENT DOCUMENTS

JP 2005122640 A 5/2005

OTHER PUBLICATIONS

Andrew S. Tanenbaum, Structured Computer Organization, 1984, Prentice Hall Inc., 2nd Edition, p. 11.*

* cited by examiner

*Primary Examiner* — Cheng-Yuan Tseng
(74) *Attorney, Agent, or Firm* — Yee & Associates, P.C.; Libby Z. Toub

(57) ABSTRACT

A mechanism for temporarily stalling selected Direct Memory Access (DMA) operations in a physical input/output (I/O) adapter in order to permit migration of data between physical pages that are subject to access by the physical I/O adapter. When a request for a DMA to a physical page in system memory is received from an I/O adapter, a migration in progress (MIP) bit in a translation control entry (TCE) pointing to the physical page is examined, wherein the MIP bit indicates whether migration of the physical page referenced in the TCE to another location in system memory is currently in progress. If the MIP bit indicates a migration of the physical page is in progress, the DMA from the I/O adapter is temporarily stalled while other DMA operations from other I/O adapters to other physical pages in system memory are allowed to continue.

20 Claims, 5 Drawing Sheets

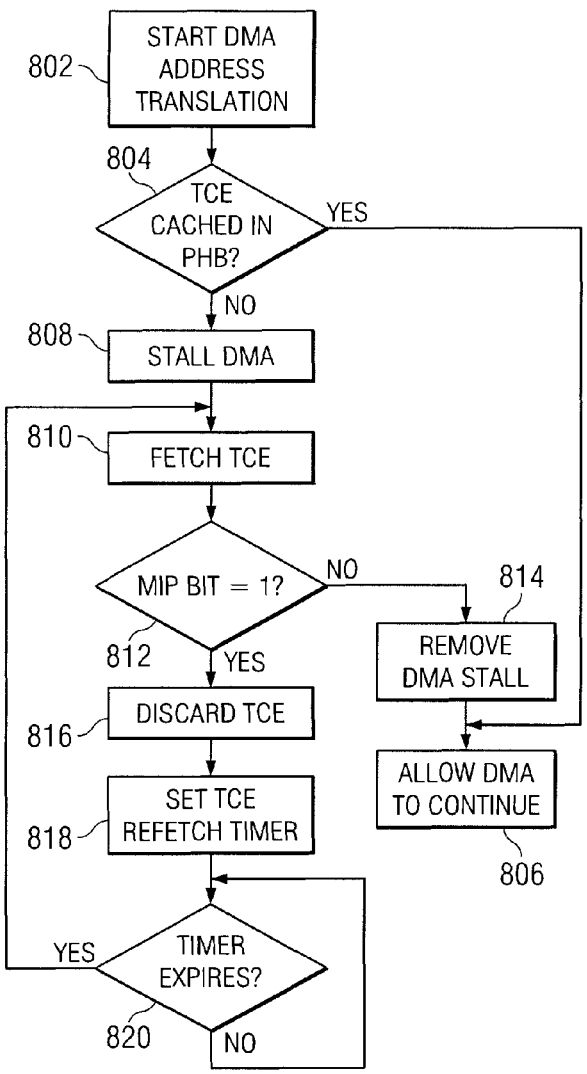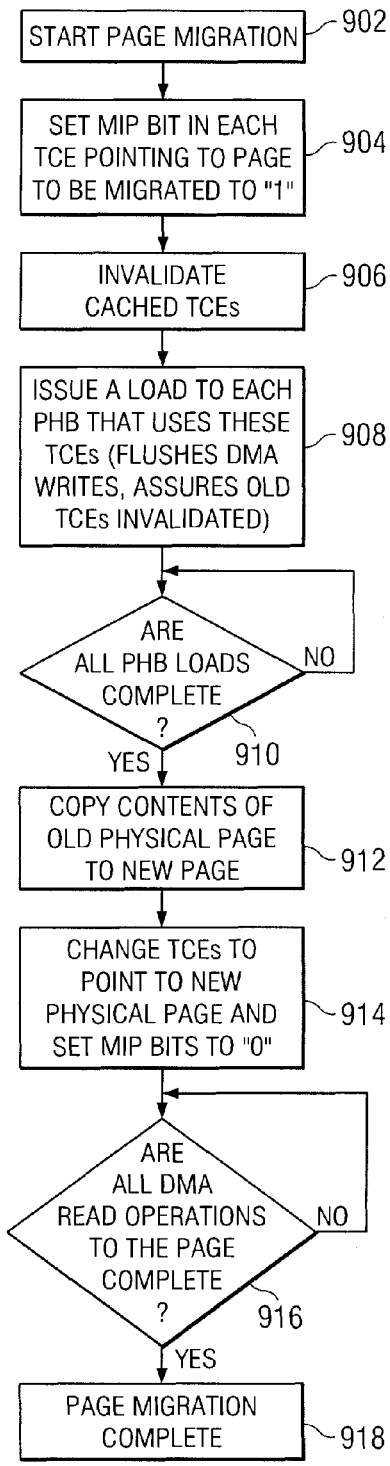

STALLING OF DMA OPERATIONS IN ORDER TO DO MEMORY MIGRATION USING A MIGRATION IN PROGRESS BIT IN THE TRANSLATION CONTROL ENTRY MECHANISM

BACKGROUND OF THE INVENTION

1. Field of the Invention

The present invention relates to data processing systems, and in particular to migration of data between physical pages that are subject to access by input/output (I/O) devices. More particularly, the present invention relates to temporarily stalling selected Direct Memory Access (DMA) operations in a physical I/O adapter in order to permit migration of data between physical pages that are subject to access by the physical I/O adapter.

2. Description of the Related Art

A computer system may be reconfigured while running without disrupting data processing in the system. For example, with multiple operating systems running on the computer, one of the operating systems may be using a certain block of memory, and there may be a need to reallocate that block of memory for use by a second operating system. Thus, the first operating system must stop using the block of physical memory to allow the second operation system access. As another example, a problem may be detected in a block of physical memory, in which case it may be desirable to remove the memory from operation so that it can be replaced. Thus, the data within a particular physical page may need to be moved or use of the physical page may need to be blocked for a period of time. If this block of memory is subject to access by I/O devices the problem of migrating or blocking the use of the physical page becomes difficult.

One method for migrating data that is subject to access by an I/O device is to temporarily but completely disable all arbitration that is done by the I/O adapter to which the I/O device is coupled in order to access the particular physical page. The process of arbitration is the first step taken during a DMA process. When arbitration is disabled, all DMA operations of the physical I/O adapter are disabled. Thus, for a short time period, all DMA operations for the physical I/O adapter that needs to access the data that is to be migrated are totally disabled when arbitration is disabled. During the short time period, the physical page data is then either migrated or updated. Once the migration or update of the physical page is complete, the DMA operations are once again enabled in the I/O adapter.

However, although existing adapters, such as industry standard Peripheral Component Interconnect (PCI) Express bus, allow for temporarily disabling or stalling DMA operations to perform data migration, these adapters require that all of the DMA operations be temporarily suspended. A drawback to this current approach is that disabling all DMA operations on the bus may adversely affect other in-flight DMA transfers to/from the I/O adapter, and cause the physical I/O adapter to enter an error state.

Therefore, it would be advantageous to have a mechanism for stalling only selected DMA operations in a physical I/O adapter in order to permit migration of physical pages that are subject to access by the physical I/O adapter while allowing other DMA operations from the physical I/O adapter to other pages in system memory to continue.

SUMMARY OF THE INVENTION

Embodiments of the present invention provide a computer implemented method and data processing system for temporarily stalling selected Direct Memory Access (DMA) operations in a physical I/O adapter in order to permit migration of data between physical pages that are subject to access by the physical I/O adapter. Stalling is the process of suspending or disabling DMA operations to/from an I/O adapter. With the mechanism of the present invention, DMA operations to/from the I/O adapter are temporarily stalled while data is migrated between the physical pages, while other DMA operations to/from other physical I/O adapters to other pages in system memory are allowed to continue. When a request for a direct memory access to a physical page in system memory is received from an input/output adapter, a migration in progress bit in a translation control entry pointing to the physical page is examined, wherein the migration in progress bit indicates whether migration of the physical page referenced in the translation control entry to another location in system memory is currently in progress. If the migration in progress bit indicates a migration of the physical page is in progress, the direct memory access from the input/output adapter is temporarily stalled while other direct memory access operations from other input/output adapters to other physical pages in system memory are allowed to continue.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 8 is a flowchart illustrating the process performed by the system hardware's address translation and control state machine and the migration control state machine in accordance with an illustrative embodiment of the present invention; and FIG. 9 is a flowchart illustrating the software/firmware control of a page migration in accordance with an illustrative embodiment of the present invention.

DETAILED DESCRIPTION OF THE PREFERRED EMBODIMENT

Figure 1:
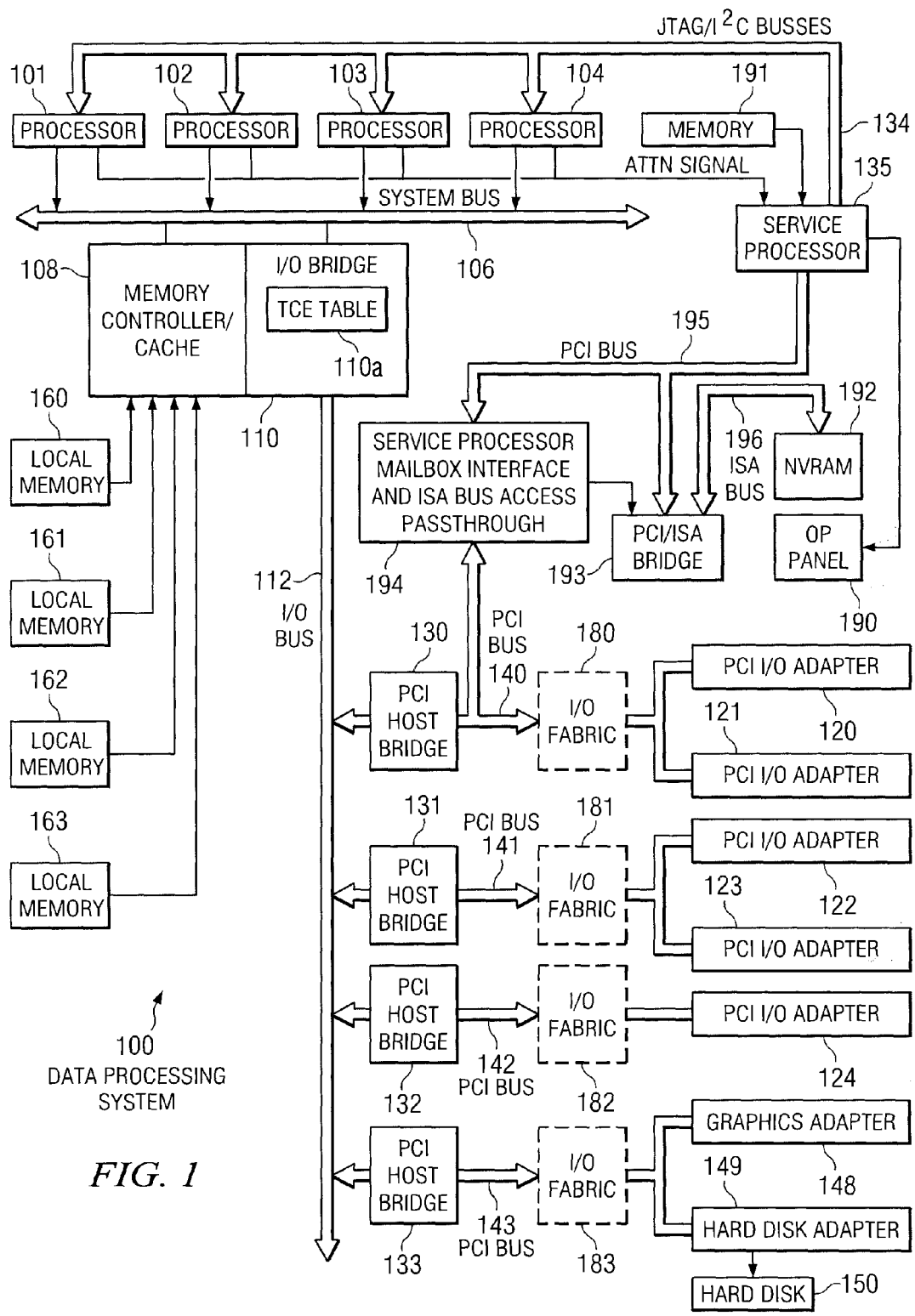
FIG. 1 is a high level block diagram of a computer system in which aspects of the present invention may be implemented.

With reference now to the figures, FIG. 1 depicts a block diagram of a data processing system in which the embodiment of the present invention may be implemented. Data processing system 100 may be a symmetric multiprocessor (SMP) system including a plurality of processors 101, 102, 103, and 104 connected to system bus 106. For example, data processing system 100 may be an IBM® eServer™, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160-163. I/O bus bridge 110 is connected to system bus 106 and provides an interface to I/O bus 112. Memory controller/cache 108 and I/O bus bridge 110 may be integrated as depicted.

Data processing system 100 is a logically partitioned (LPAR) data processing system; however, it should be understood that the invention is not limited to an LPAR system but can also be implemented in other data processing systems. LPAR data processing system 100 has multiple heterogeneous operating systems (or multiple copies of a single operating system) running simultaneously. Each of these multiple operating systems may have any number of software programs executing within it. Data processing system 100 is logically partitioned such that different PCI input/output adapters (IOAs) 120, 121, 122, 123 and 124, graphics adapter 148, and hard disk adapter 149, or parts thereof, may be assigned to different logical partitions. In this case, graphics adapter 148 provides a connection for a display device (not shown), while hard disk adapter 149 provides a connection to control hard disk 150.

Thus, for example, suppose data processing system 100 is divided into three logical partitions, P1, P2, and P3. Each of PCI IOAs 120-124, graphics adapter 148, hard disk adapter 149, each of host processors 101-104, and memory from local memories 160-163 is assigned to each of the three partitions. In this example, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and PCI IOAs 121, 123, and 124 may be assigned to logical partition P1; processors 102-103, some portion of memory from local memories 160-163, and PCI IOAs 120 and 122 may be assigned to partition P2; and processor 104, some portion of memory from local memories 160-163, graphics adapter 148 and hard disk adapter 149 may be assigned to logical partition P3.

Each operating system executing within a logically partitioned data processing system 100 is assigned to a different logical partition. Thus, each operating system executing within data processing system 100 may access only those IOAs that are within its logical partition. For example, one instance of the Advanced Interactive Executive (AIX®) operating system may be executing within partition P1, a second instance (copy) of the AIX® operating system may be executing within partition P2, and a Linux® or OS/400 operating system may be operating within logical partition P3.

Peripheral component interconnect (PCI) host bridges (PHBs) 130, 131, 132, and 133 are connected to I/O bus 112 and provide interfaces to PCI local busses 140, 141, 142 and 143, respectively. PCI IOAs 120-121 are connected to PCI local bus 140 through I/O fabric 180, which comprises switches and bridges. In a similar manner, PCI IOA 122 is connected to PCI local bus 141 through I/O fabric 181, PCI IOAs 123 and 124 are connected to PCI local bus 142 through I/O fabric 182, and graphics adapter 148 and hard disk adapter 149 are connected to PCI local bus 143 through I/O fabric 183. I/O fabrics 180-183 provide interfaces to PCI busses 140-143. A typical PCI host bridge will support between four and eight IOAs (for example, expansion slots for add-in connectors). Each PCI IOA 120-124 provides an interface between data processing system 100 and input/output devices such as, for example, other network computers, which are clients to data processing system 100.

PCI host bridge 130 provides an interface for PCI bus 140 to connect to I/O bus 112. PCI bus 140 also connects PCI host bridge 130 to service processor mailbox interface and ISA bus access pass-through logic 194 and I/O fabric 180. Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195. Service processor 135 is also connected to processors 101-104 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SP-ATTN signals of the host processors 101, 102, 103, and 104 are connected together to an interrupt input signal of the service processor. Service processor 135 has its own local memory 191, and has access to the hardware OP-panel 190.

When data processing system 100 is initially powered up, service processor 135 uses the JTAG/I$^2$C busses 134 to interrogate the system (host) processors 101-104, memory controller/cache 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating host processors 101-104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/O bridge 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using an IBM® eServer™ iSeries™ Model 840 system available from International Business Machines Corporation. Such a system may support logical partitioning using an OS/400® operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

I/O bridge 110 includes table 110a with associated control for that table. Translation and control entries (TCEs) are stored in TCE table 110a. Table 110a is an I/O address translation and protection mechanism that provides, on an I/O page basis, the capability to control I/O operations to a physical page from an I/O device.

The TCE entries associate the real address of physical pages of physical memory with the address presented on the I/O buses by the I/O adapters. Each entry associates a particular physical page with a particular I/O bus page. TCE table 110a is indexed by the I/O bus address of DMA operations. This table is used to ensure that the I/O adapter is accessing only the storage locations that it has been assigned. In addition, the TCE mechanism provides the indirect address mechanism, which allows the embodiment of this invention to be implemented.

Figure 2:
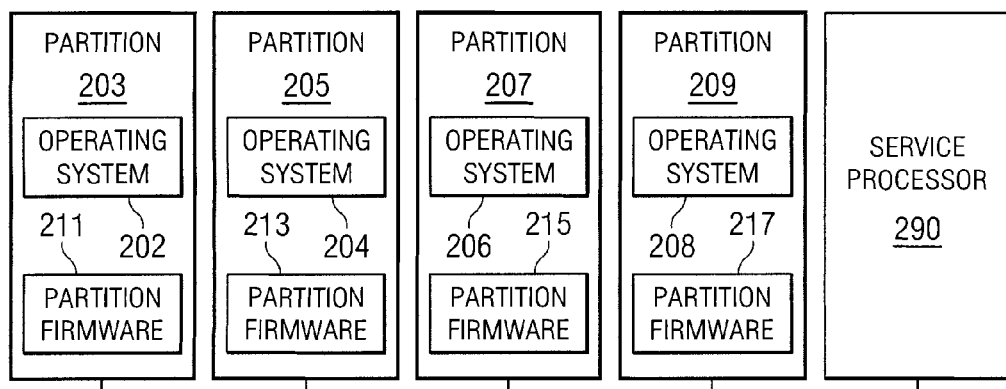
FIG. 2 is a block diagram of an exemplary logical partitioned platform in which the present invention may be implemented.

FIG. 2 depicts a block diagram of an exemplary logical partitioned platform that includes the illustrative embodiment of the present invention. The hardware in logical partitioned platform 200 may be implemented as, for example, data processing system 100 in FIG. 1. Logically partitioned platform 200 includes partitioned hardware 230, operating systems (OS) 202, 204, 206, 208, and platform firmware 210. Operating systems 202, 204, 206, and 208 may be multiple copies of a single operating system or multiple heterogeneous operating systems simultaneously run on logical partitioned platform 200. These operating systems may be implemented using OS/400®, which is designed to interface with a partition management firmware, such as Hypervisor. OS/400® is used only as an example in these illustrative embodiments. Other types of operating systems, such as AIX® and Linux®, may also be used depending on the particular implementation.

Operating systems 202, 204, 206, and 208 are located in partitions 203, 205, 207, and 209. Hypervisor software is an example of software that may be used to implement platform firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation.

When partitions 203, 205, 207, and 209 are instantiated, a copy of bootstrap code is loaded onto partitions 203, 205, 207, and 209 by platform firmware 210. Thereafter, control is transferred to the bootstrap code with the bootstrap code then loading the open firmware and RTAS. The processors associated with or assigned to the partitions are then dispatched to the partition's memory to execute the partition firmware.

Partitioned hardware 230 includes a plurality of processors 232-238, a plurality of system memory units 240-246, a plurality of input/output adapters (IOA) 248-262, storage unit 270, and TCE table 272. Each of the processors 232-238, memory units 240-246, NVRAM storage 298, and I/O Adapters 248-262, or parts thereof, may be assigned to one of multiple partitions within logical partitioned platform 200, each of which corresponds to one of operating systems 202, 204, 206, and 208.

Platform firmware 210 performs a number of functions and services for partitions 203, 205, 207, and 209 to create and enforce the partitioning of logically partitioned platform 200. Platform firmware 210 is a firmware implemented virtual machine identical to the underlying hardware. Thus, platform firmware 210 allows the simultaneous execution of independent OS images 202, 204, 206, and 208 by virtualizing the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

In an LPAR environment, it is not permissible for resources or programs in one partition to affect operations in another partition. Furthermore, to be useful, the assignment of resources needs to be fine-grained. For example, it is often not acceptable to assign all I/O Adapters that are attached to a particular PCI host bridge (PHB) to the same partition, as that will restrict configurability of the system, including the ability to dynamically move resources between partitions.

Accordingly, some functionality is needed in the PCI host bridges that connect I/O Adapters to the I/O bus so as to be able to assign resources, such as individual I/O Adapters or parts of I/O Adapters to separate partitions; and, at the same time, prevent the assigned resources from affecting other partitions such as by obtaining access to resources of the other partitions.

Figure 3:
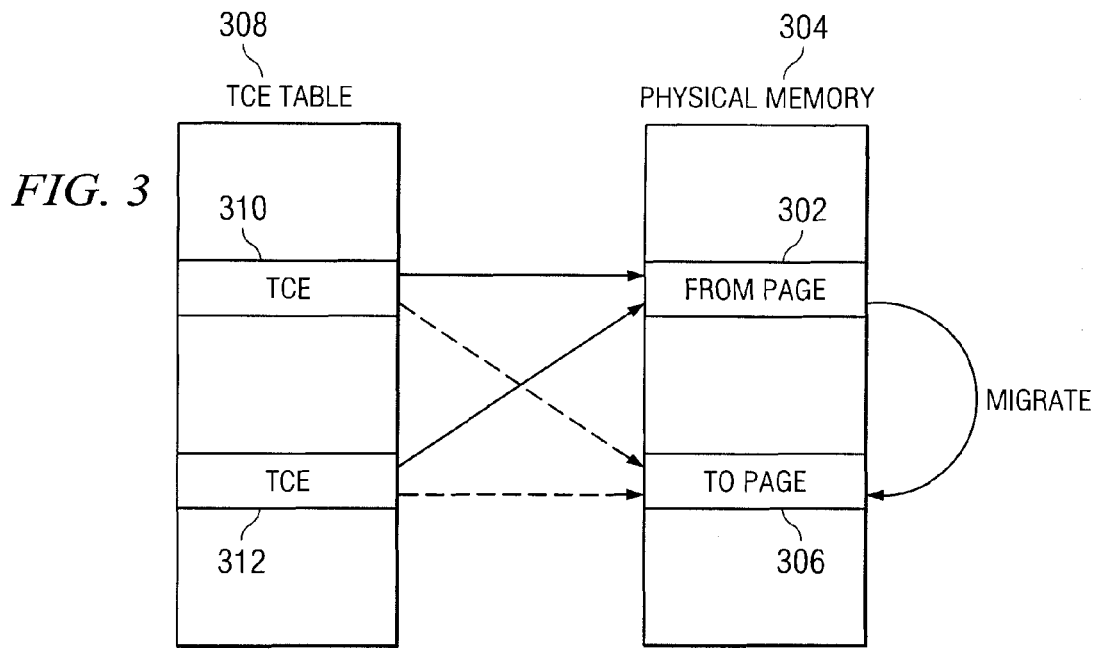
FIG. 3 is a block diagram of a page migration translation process in accordance with an illustrative embodiment of the present invention.

FIG. 3 is a block diagram of a page migration translation process in accordance with an illustrative embodiment of the present invention. Page migration is the process of moving data from one physical memory page to a different memory page. This action should be transparent to users of the data. For instance, in this illustrative example, page migration may comprise moving page 302 in physical memory 304 to a different location in physical memory, or page 306. Page migration may be performed transparent to user by redirecting the I/O adapter's I/O bus page address via a translation control entry (TCE) mechanism. The TCE mechanism uses TCE table 308 to identify the physical memory address of the data. TCE table 308 is an example of an address translation lookup table, such as TCE table 110a in FIG. 1. TCE tables are used to direct the DMA accesses of I/O adapters to the proper target memory and can be changed to point to the new memory addresses at the new data location after data migration.

TCE table 308 is implemented for each I/O host bridge to support all input/output (I/O) adapters on the secondary buses of any I/O bridges attached to the primary bus. TCE table 308 includes multiple page entries, such as TCEs 310 and 312.

These page entries are fetched by an address translation and control mechanism based on the page address on the I/O bus. One or more TCEs may point to a particular page. As shown, both TCEs 310 and 312 point to page 302. When page 302 is migrated to page 306, the contents of the TCEs must be changed to point to the new page, or page 306. This change to the content of each TCE when a page is migrated is performed without involving the I/O adapter or the I/O adapter's device driver. In this manner, the content of TCEs 310 and 312, which originally pointed to page 302, is changed to point to the destination of the memory migration, or page 306.

Figure 4:
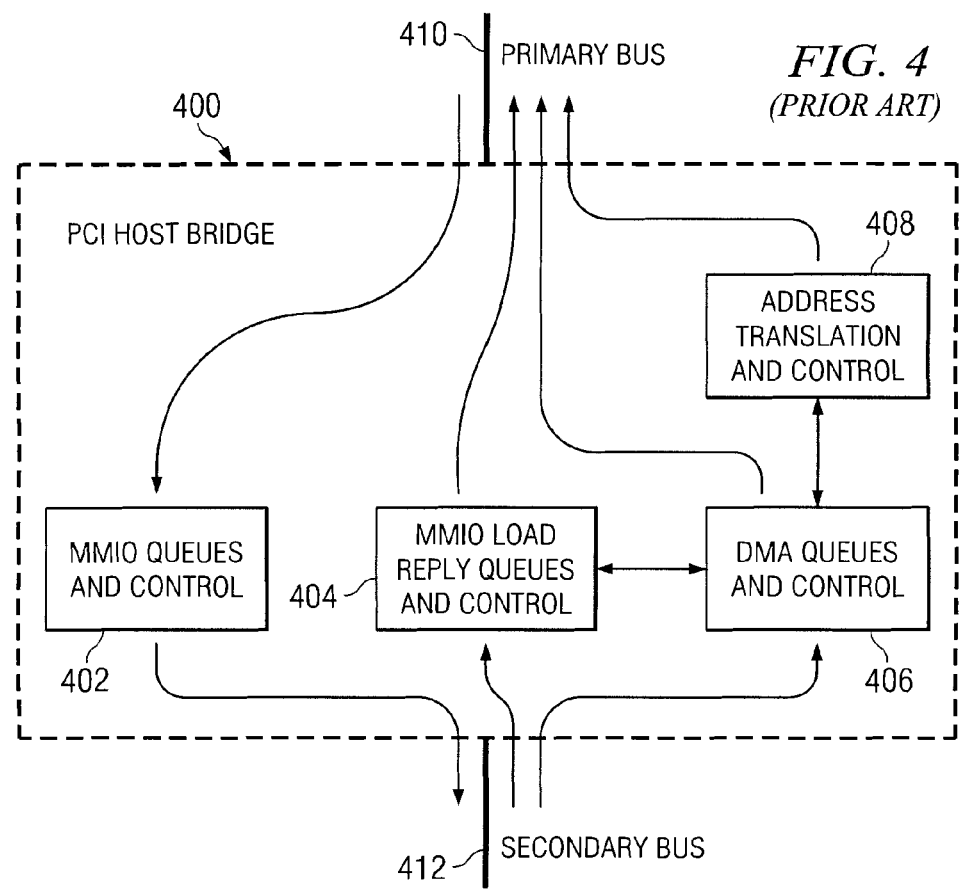
FIG. 4 is a block diagram of components in a known PCI host bridge (PHB)

FIG. 4 is a block diagram of components in a known I/O host bridge, such as a PCI host bridge (PHB). In this illustrative example, PCI host bridge 400 comprises Memory Mapped I/O (MMIO) Queues and Control 402, MMIO Load Reply Queues and Control 404, DMA Queues and Control 406, and Address Translation and Control 408. When PCI host bridge 400 receives MMIO Load and Store requests from primary bus 410, PCI host bridge 400 queues and controls the MMIO Load and Store requests at MMIO Queues and Control 402. MMIO operations may consist of the execution of a single load or store instruction that will transfer data from or to the addressed MMIO space. From MMIO Queues and Control 402, MMIO Load and Store requests flow out to secondary bus 412.

PCI host bridge 400 also receives DMA Read and Write requests from secondary bus 412, which flow into the DMA Queues and Control 406. When DMA Write and Read requests are received from secondary bus 412, PCI host bridge 400 queues and controls the DMA Write and Read requests at DMA Queues and Control 406. DMA queues and control 406 may direct Address Translation and Control 408 to fetch translation control entries from TCE table 110a in FIG. 1. Address Translation and Control 408 fetches an entry in the TCE table corresponding to the supplied DMA address in order to determine the location of the physical memory. In this manner, the fetched entries are used to translate and control the DMA Write or Read requests.

PCI host bridge 400 also receives MMIO Load replies from secondary bus 412, which are queued and controlled at MMIO Load Reply Queues and Control 404. At DMA Queues and Control 406, DMA Write and Read requests flow out to primary bus 410. MMIO Load replies also flow out to primary bus from MMIO Load Reply Queues and Control 404.

Figure 5:
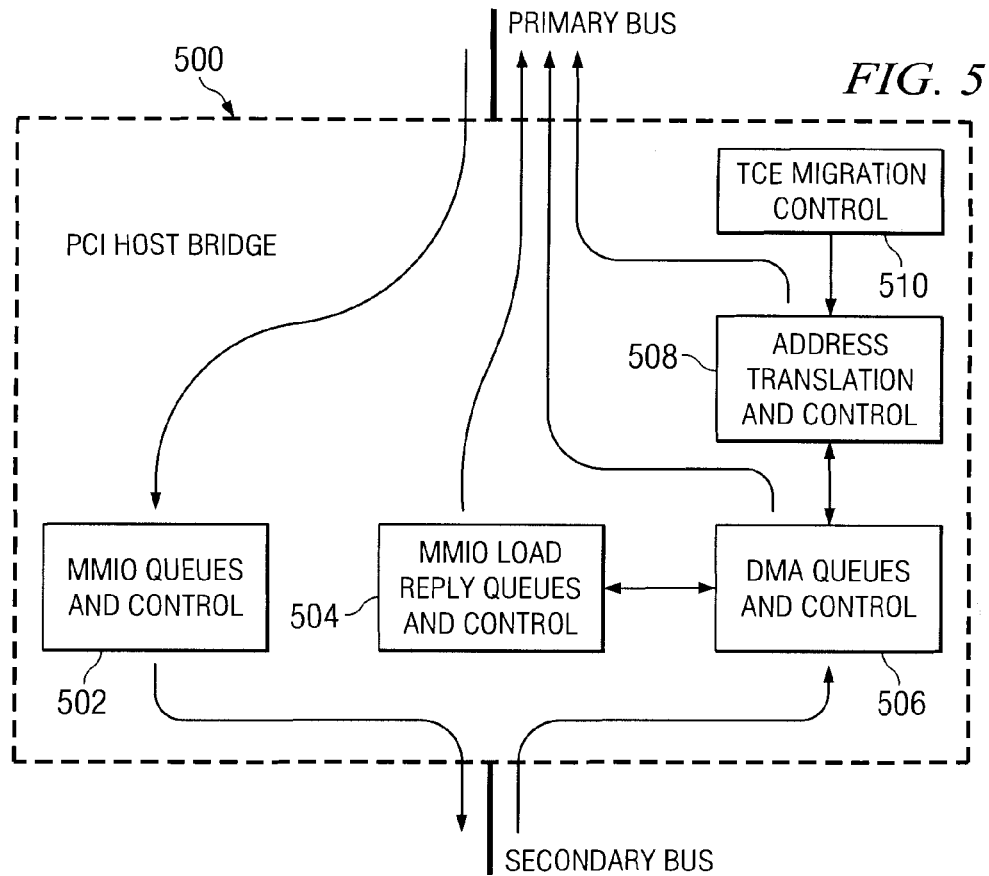
FIG. 5 is a block diagram of components including a Translation Control Entry (TCE) migration control in a PCI host bridge in accordance with an illustrative embodiment of the present invention.

FIG. 5 is a block diagram of components including a Translation Control Entry migration control in a PCI host bridge in accordance with an illustrative embodiment of the present invention. Aspects of the present invention may apply to all forms of peripheral component interconnect (PCI), including conventional PCI, PCI-X and PCI Express, as well as to other I/O buses. Like PCI host bridge (PHB) 400 in FIG. 4, PCI host bridge 500 comprises Memory Mapped I/O (MMIO) Queues and Control 502, MMIO Load Reply Queues and Control 504, DMA Queues and Control 506, and Address Translation and Control 508, which perform operations similar to those components in known PCI host bridge 400 in FIG. 4. However, PCI host bridge 500 also comprises TCE migration control 510, which comprises logic for stalling selected DMA operations to permit migration of physical pages without adversely affecting other in-flight DMA operations. When Address Translation and Control 508 fetches an entry from the TCE table such as TCE table 110a in FIG. 1, TCE migration control 510 receives and examines the entry to determine if migration of the physical page of memory associated with the entry is in progress. TCE migration control 510 is described in further detail in FIG. 7 below.

Figure 6:
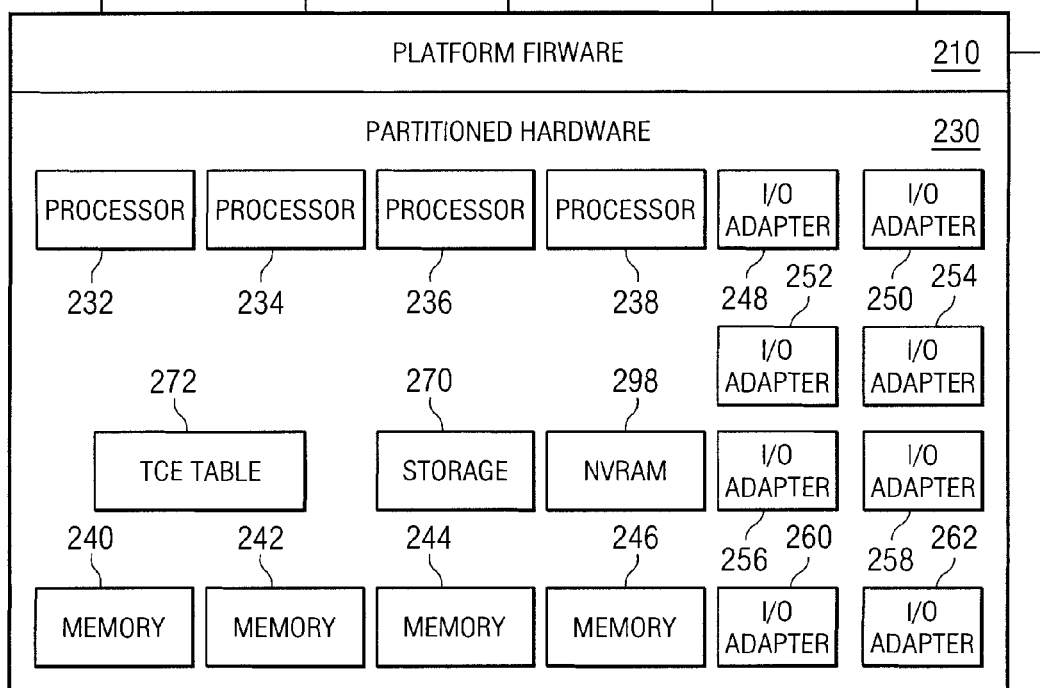
FIG. 6 is an exemplary translation and control entry in accordance with an illustrative embodiment of the present invention.
Figure 6:
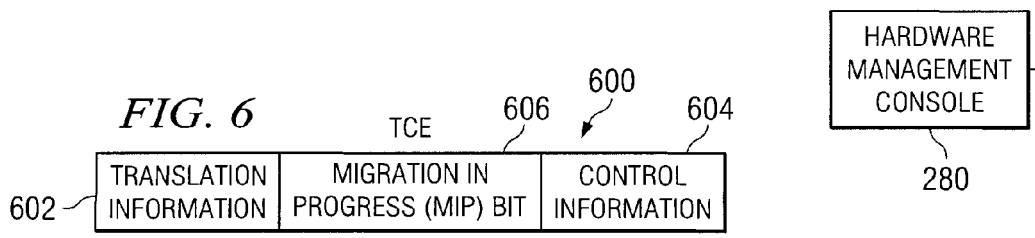

FIG. 6 is an exemplary TCE entry in accordance with an illustrative embodiment of the present invention. TCE entry 600 includes translation information 602, read and write control information 604, and Migration In Progress (MIP) bit 606. Translation information 602 may include the physical page number of the data (i.e., the starting address of the page in memory). Read and write control information 604 may include control to indicate that the page can be accessed only by DMA Reads, only by DMA Writes, by both DMA Reads and DMA Writes, or not at all.

Migration in Progress (MIP) bit 606 indicates whether the particular physical page of memory associated with the TCE entry is currently being migrated. If MIP bit 606 is set (i.e., MIP bit=1), any DMA operation to the particular page and any proceeding DMA operations from the same I/O adapter, will be stalled until the page migration is completed. If MIP bit 606 is off (i.e., MIP bit=0), DMA operations to the page are allowed to continue.

Figure 7:
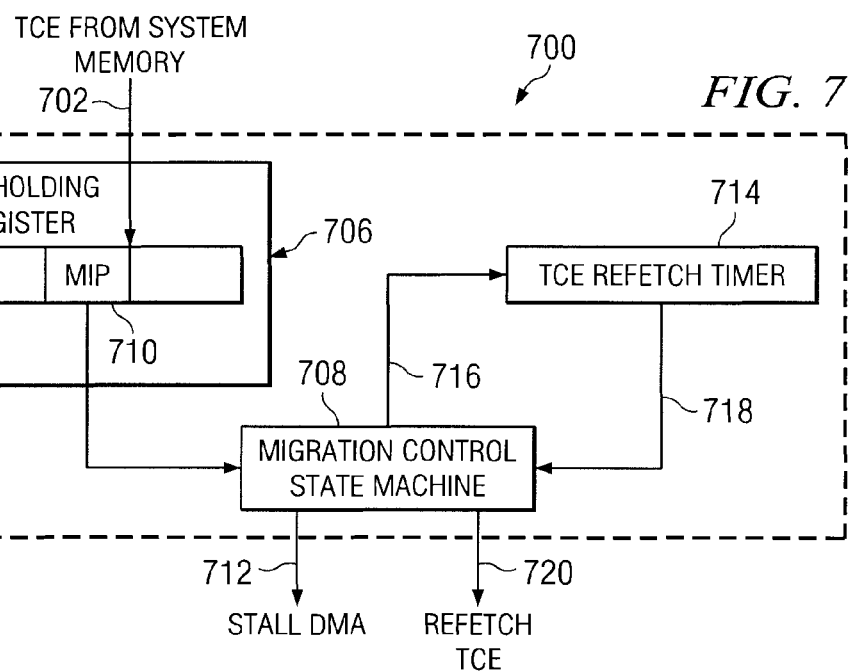
FIG. 7 is a block diagram illustrating logic of the TCE migration control in FIG. 5 in accordance with an illustrative embodiment of the present invention.

FIG. 7 is a block diagram illustrating the logic of the TCE migration control in accordance with an illustrative embodiment of the present invention. TCE migration control logic 700 is a detailed example of TCE migration control logic 510 as illustrated above in FIG. 5. TCE migration control logic 700 is used when the address translation and control, such as address translation and control 508 in FIG. 5, fetches a TCE from the TCE table in system memory 702. Fetched TCE 704 is placed in TCE holding register 706 and examined by migration control state machine 708. In particular, migration control state machine 708 examines MIP bit 710 in TCE 704 to determine whether the page address in the TCE is associated with a physical page currently being migrated to a different location in system memory. For instance, if MIP bit 710 is set to 1, migration control state machine 708 sends a signal to address translation and control 508 in FIG. 5 to stall the DMA 712. Until TCE migration control logic 700 removes the stall DMA, address translation and control 508 in FIG. 5 will not allow any DMA Write or DMA Read requests from the I/O adapter performing the DMA, or any MMIO Load replies from the I/O adapter, to proceed.

It should be noted that although DMA Write or Read requests are not allowed, DMA Read replies are allowed to bypass stalled MMIO Load or Store requests that are queued along the path. Allowing DMA Read replies to bypass stalled MMIO Load or Store requests allows the re-read of the TCE by address translation and control 508 in FIG. 5, even if the MMIO queues back up with uncompleted requests.

When the stall DMA 712 is signaled, the TCE fetched by address translation and control 508 in FIG. 5 is discarded from TCE holding register 706 and TCE refetch timer 714 is started 716. TCE refetch timer 714 is implemented to prevent flooding the system with requests to refetch the TCE when the system has not had time to complete the page migration operation. Thus, TCE refetch timer 714 extends the time period when address translation and control 508 in FIG. 5 refetches the TCE, thereby allowing the system software or firmware to complete the page migration operation and reset the MIP bit in the TCE to 0. Migration control state machine 708 then waits for TCE refetch timer 714 to expire.

When migration control state machine 708 determines that TCE refetch timer 714 has expired 718, migration control state machine 708 signals 720 address translation and control 508 in FIG. 5 to refetch the TCE. When the TCE is refetched, the refetched entry is placed in holding register 706. The process continues in this loop until the migration control state machine 708 determines that MIP bit 710 in the TCE for the stalled operation is 0, at which time the address translation and control 508 in FIG. 5 is signaled to continue by the deactivation of the Stall DMA signal 712, and DMA operations to the physical pages referenced by the TCE may resume.

In another embodiment, TCE refetch timer 714 may be eliminated, thereby causing the discard and refetch of the TCE to be performed immediately when address translation and control 508 determines MIP bit 710 in TCE 704 in holding register 706 is set to 1.

In most cases, PCI host bridges will not differentiate between operations to/from different I/O adapters, thereby causing all DMA and MMIO operations to temporarily stall. However, PCI-X and PCI Express adapters provide, as a performance enhancement, several mechanisms which allow the differentiation of data streams. For example, in PCI-X and PCI Express, the Requester ID (the bus number, device number, and function number) may be used to associate the DMAs. A decoding of the MMIOs to associate the MMIOs to a Requester ID may be used to tie the MMIO path to the stalled DMA path. For PCI Express, this may be accomplished by the Virtual Channel mechanism. As an additional performance enhancement, it should also be noted that the DMA operations do not need to be stalled until the first DMA Write operation to a page with the MIP bit 710 set, and therefore embodiments are possible where the stall is delayed as long as possible, or even avoided entirely. That is, if the page being migrated is not being modified, it is permissible to continue operations. Once a DMA Write is detected to the page being migrated, then further DMA operations to/from that page and to/from the I/O device requesting the DMA Write to the page, must be stalled.

FIG. 8 is a flowchart illustrating the process preformed by the hardware's address translation and control and migration control state machines in order to temporarily and selectively stall specific DMA operations, in accordance with an illustrative embodiment of the present invention. The process begins with the address translation and control logic initiating an address translation responsive to receiving a direct memory access request from a bus (step 802). The address translation may be performed by accessing the TCE table to obtain a TCE comprising the physical page address that the address translation should apply to the second bus in order to access the correct physical page associated with the memory request from the first bus. The hardware then makes a determination whether the TCE needed is already cached, such as within I/O data buffers in the I/O Bridge 110 in FIG. 1, and whether the cache data is valid (step 804). If the TCE is cached and valid, the hardware allows the direct memory access to continue using the cached TCE (step 806). If the TCE is not cached, the hardware stalls the direct memory access of the particular request (step 808), pending the fetch of the TCE from the TCE table.

When the TCE is fetched (step 810), a determination is made as to whether the MIP bit in the entry is set to 1 (step 812). If the MIP bit is not set (MIP bit=0), then the hardware removes the direct memory access stall (step 814). The process then returns to step 806 and the direct memory access is allowed to continue using the fetched TCE. Turning back to step 812, if the MIP bit is set to 1, then the fetched TCE is discarded (step 816), and the TCE refetch timer is started (step 818). The migration control state machine then waits for the TCE refetch timer to expire (step 820). When the timer expires, the process returns to step 810 and the TCE is again fetched from the TCE table, with the process continuing thereafter.

FIG. 9 is a flowchart illustrating the process performed by the software/firmware to control the page migration in accordance with an illustrative embodiment of the present invention. The process begins with the software/hardware initiating the page migration (step 902). The software/firmware sets the MIP bit (MIP bit=1) in each TCE entry that points to the memory page to be migrated (step 904). Setting the MIP bit to 1 signals that a page migration is in progress. Responsive to changing the MIP bits, each of the cached copies of the TCEs are invalidated (step 906). Invalidation of TCE entries is known in the art and may be performed in various ways depending upon the platform used.

Software/firmware then issues an MMIO Load to each PCI host bridge that may use the TCEs with their MIP bits set to 1 (step 908). These MMIO Loads cause any hardware invalidations of the TCEs to arrive at the PCI host bridge prior to an MMIO Load reply being returned to the processor, and will assure that all writes to a TCE prior to its invalidation have been flushed to memory (this process is assured by the normal PCI ordering rules).

Software/firmware waits for all of the synchronizing MMIO Loads to complete (step 910). When the Loads are completed, the software/firmware then copies the contents of the old physical page to the new page by performing software Loads to the memory source page and Stores to the destination page (step 912). On completion of this copy, the software/firmware sets the TCEs to point to the new page, and sets the MIP bits in those TCEs to 0 (step 914). The software/firmware waits long enough for all direct memory access Read requests and replies, which are in-flight using the old TCE value to complete (step 916). Upon determining that all of the direct memory access Read operations are completed, the software/firmware may declare the page migration as complete (step 918).

The invention can take the form of an entirely hardware embodiment, or an embodiment containing both hardware and software elements. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for selectively stalling direct memory access (DMA) operations, the computer implemented method comprising:

examining a migration in progress (MIP) bit in a translation control entry (TCE) holding register that is set to a value to indicate whether a page address in the TCE is associated with a physical page in migration;

determining, based on the value of the MIP bit, whether a page address referenced in a TCE table corresponds with a physical page being migrated to another location in a system memory; and stalling, only for the physical page being migrated, all DMA operations from an input/output (I/O) adapter corresponding only to the physical page being migrated, responsive to the value of the MIP bit being set to indicate that the physical page being migrated corresponds to the referenced page address in the TCE.

2. The computer implemented method of claim 1, further comprising:

continuing the DMA operations responsive to the value of the MIP bit being set to off.

3. The computer implemented method of claim 1, wherein the stalling includes temporarily suspending any DMA operations from the I/O adapter corresponding only to the physical page being migrated until a migration is completed.

4. The computer implemented method of claim 1, wherein the examining further comprises:

fetching a TCE from a TCE table in system memory; and
placing the TCE in a holding register in the I/O adapter to examine the MIP bit in the TCE.

5. The computer implemented method of claim 1, wherein the stalling includes disabling DMA write requests and DMA read requests from the I/O adapter corresponding only to the physical page being migrated, and memory mapped I/O load replies from the I/O adapter and only enabling DMA read replies.

6. The computer implemented method of claim 1, wherein the stalling is delayed until a DMA write request to the physical page being migrated is received.

7. The computer implemented method of claim 4, further comprising:

responsive to stalling the DMA, discarding the TCE from the TCE holding register; and
refetching the TCE from the TCE table until the MIP bit is reset to a value that indicates a completion of the physical page migration.

8. The computer implemented method of claim 7, further comprising:

responsive to discarding the TCE from the holding register, initiating a refetch timer; and
responsive to expiration of the refetch timer, refetching the TCE from the TCE table until the MIP bit indicates that a migration of the physical page in the DMA is completed, wherein the TCE is refetched each time the TCE is discarded and the refetch timer expires.

9. The computer implemented method of claim 1, further comprising:

responsive to receiving the request, determining whether the TCE needed to perform the DMA is cached; and
if the TCE is not cached, stalling the DMA pending a fetch of the TCE from the TCE table.

10. The computer implemented method of claim 9, further comprising:

if the TCE is cached, determining if the cached TCE is valid; and
if the cached TCE is valid, allowing the DMA to continue using the cached TCE.

11. The computer implemented method of claim 1, wherein the physical page being migrated to another location comprises:

setting the MIP bit only in translation control entries (TCEs) pointing to the physical page to indicate that a migration of the physical page is in progress;

responsive to setting the MIP bits, invalidating cached copies of the TCEs;

issuing a memory mapped I/O load to each peripheral component interconnect host bridge;

responsive to a determination that all memory mapped I/O loads are complete, copying content of the physical page to a new physical page;

modifying the TCEs to point to the new page; and setting each MIP bit in the TCEs to indicate a completion of the migration of the physical page.

12. The computer implemented method of claim 11, wherein memory mapped I/O loads cause invalidations of the TCEs to arrive at the peripheral component interconnect host bridge prior to the return of a memory mapped I/O load reply to the processor and to ensure all DMA writes to memory prior to the TCE invalidation are flushed to memory.

13. The computer implemented method of claim 11, wherein the copying includes performing software loads to the physical page and software stores to the new page.

14. An apparatus for stalling direct memory access operations, the apparatus comprising:

an input/output bridge for receiving a request for a direct memory access to a physical page in system memory from an input/output adapter; and a translation control entry migration control connected to the input/output bridge, wherein the translation control entry migration control comprises a migration control state machine;

wherein the migration control state machine examines a migration in progress bit in a translation control entry pointing to the physical page in response to the input/output bridge receiving the request, wherein the migration in progress bit indicates whether a migration of the physical page referenced in the translation control entry to another location in system memory is in progress; and wherein the migration control state machine stalls, for the physical page being migrated, the direct memory access from the input/output adapter while continuing other direct memory access operations from the input/output adapter and from other input/output adapters to other physical pages in system memory if the migration in progress bit indicates a migration of the physical page is in progress.

15. A data processing system for stalling direct memory access operations, the data processing system comprising:

a bus;

a storage device connected to the bus, wherein the storage device contains computer usable code;

at least one managed device connected to the bus; and a processing unit connected to the bus, wherein the processing unit executes the computer usable code to examine a migration in progress (MIP) bit in a translation control entry (TCE) holding register that is set to a value to indicate whether a page address in the TCE is associated with a physical page in migration; determine, based on the value of the MIP bit, whether a page address referenced in a TCE table corresponds with a physical page being migrated to another location in a system memory; and stall, only for the physical page being migrated, all DMA operations from an input/output (I/O) adapter corresponding only to the physical page being migrated, responsive to the value of the MIP bit being set to indicate that the physical page being migrated corresponds to the referenced page address in the TCE.

16. The data processing system of claim 15, wherein the processing unit further executes the computer usable code to allow the direct memory access to the physical page to continue if the migration in progress bit indicates that no migration of the physical page is in progress.

17. The data processing system of claim 15, wherein the direct memory access from the input/output adapter is stalled until the migration is completed.

18. The data processing system of claim 15, wherein the computer usable code to examine a migration in progress (MIP) bit in a translation control entry (TCE) holding register further comprises computer usable code to fetch the translation control entry from a translation control entry table in system memory and place the translation control entry in a holding register in the input/output adapter to examine the migration in progress bit in the translation control entry.

19. The data processing system of claim 15, wherein the direct memory access from the input/output adapter is stalled by disabling direct memory access write requests and direct memory access read requests from the input/output adapter, and memory mapped input/output load replies from the input/output adapter.

20. The data processing system of claim 15, wherein migration of the physical page is performed by setting the migration in progress bit in all translation control entries pointing to the physical page to indicate that a migration of the physical page is in progress; for invalidating cached copies of the translation control entries in response to setting the migration in progress bits; issuing a memory mapped input/output load to each peripheral component interconnect host bridge; copying content of the physical page to a new physical page in response to a determination that all memory mapped input/output loads are complete; modifying the translation control entries to point to the new page; setting each migration in progress bit in the translation control entries to indicate that no migration of the physical page is in progress; and declaring the migration as completed in response to determining that all in-flight direct memory access read operations are complete.

\* \* \* \* \*